INVENTOR.
Yoshinori Okamoto

INVENTOR.
Yoshinori Okamoto

United States Patent Office 3,438,277
Patented Apr. 15, 1969

3,438,277
DRIVING APPARATUS FOR A MOTORIZED
TWO-WHEEL VEHICLE
Yoshinori Okamoto, Tokyo, Japan, assignor to Kabushiki
Kaisha Honda Gijutsu Kenkyusho, Saitama-ken, Japan
Filed July 19, 1967, Ser. No. 654,532
Claims priority, application Japan, July 28, 1966,
41/70,980
Int. Cl. F16h 3/08
U.S. Cl. 74—371                                           7 Claims

ABSTRACT OF THE DISCLOSURE

A driving apparatus for a motorized two-wheel vehicle in which a driving sprocket for a drive wheel of the vehicle is loosely mounted on an end portion of an output shaft projecting from a side wall of a frame of an internal combustion engine, a hollow cover being mounted on the frame and enclosing the driving sprocket while accommodating the end portion of the output shaft, a subsidiary shaft being secured in the cover and extending parallel to the output shaft, a speed reducing gear assembly being provided between the end portion and the subsidiary shaft so that the output shaft and the driving sprocket may be connected to one another directly or through the speed reducing gear assembly.

Brief summary of the invention

This invention relates to drive apparatus for a motorized two-wheel vehicle and particularly to a speed change device for regulating the speed and power delivered to the drive wheel of a two-wheel motorized vehicle.

In order to increase the power of a motorized two-wheel vehicle, such as a motorcycle, in ascending a slope with its drive wheel reduced in speed, it has been usual heretofore to change a number of parts namely, a driving sprocket attached to the output shaft of a speed change device, a driven sprocket attached to the drive wheel and a chain applied therebetween. This changing operation is very troublesome and inconvenient.

According to the present invention, a drive sprocket for the drive wheel of the vehicle is loosely mounted on an output or drive shaft projecting from a frame, and a cover is mounted on the frame and receives an end portion of said output shaft, a subsidiary shaft being mounted in the cover and extending parallel to the output shaft, a speed reducing gear assembly being provided between the end portion of the output shaft and the subsidiary shaft so that the output shaft and the driving sprocket may be connected to one another directly or through the speed reducing gear assembly. Thus, the troublesome changing operation as mentioned above is eliminated and at the same time the apparatus of the present invention can be applied to a conventional motorized two-wheel vehicle without major reconstruction of said vehicle. Moreover, the structure of the apparatus is of great simplicity.

In further accordance with the invention, the gear assembly is in driving relation with the sprocket, and first means in the form of a claw rod is slidable on the drive shaft for engaging different gears of the assembly to effect direct driving of the sprocket from the drive shaft or driving of the sprocket from the drive shaft via the gear assembly. The claw rod is displaced by a second means inclusive of an external control lever having a number of settable positions for moving the claw rod for engagement with the different gears of the assembly.

Detailed description

Figure 1:
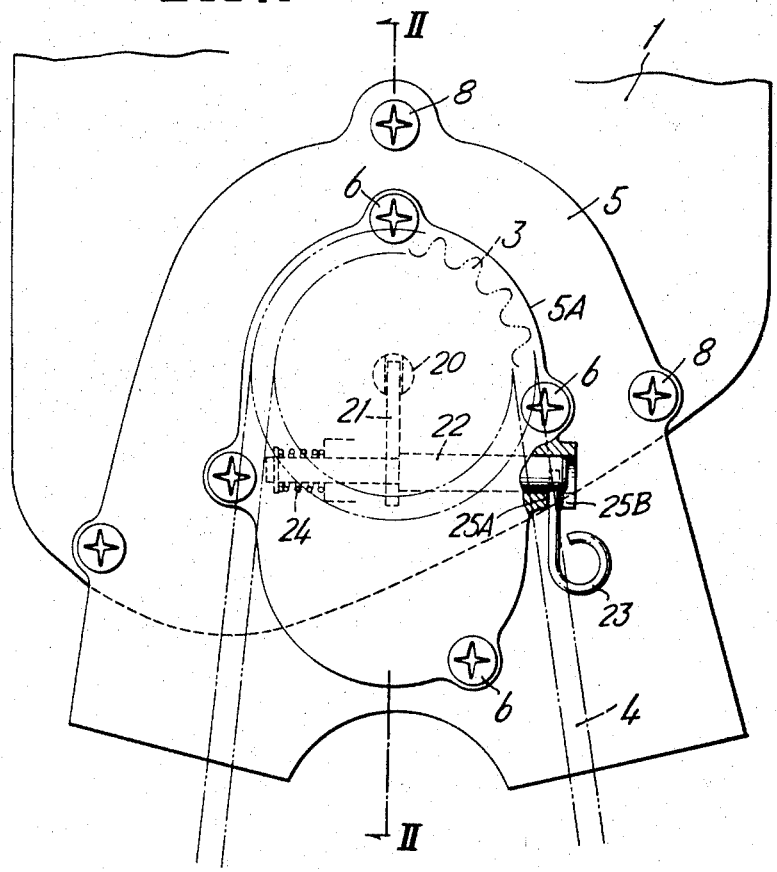
FIGURE 1 is a front view, partly in section, of the apparatus of the present invention.
Figure 4:
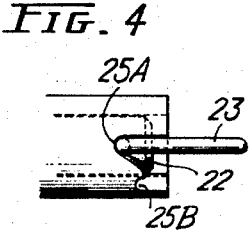
FIGURE 4 is a view from below in FIG. 1 of an operation lever portion of the apparatus.
Figure 2:
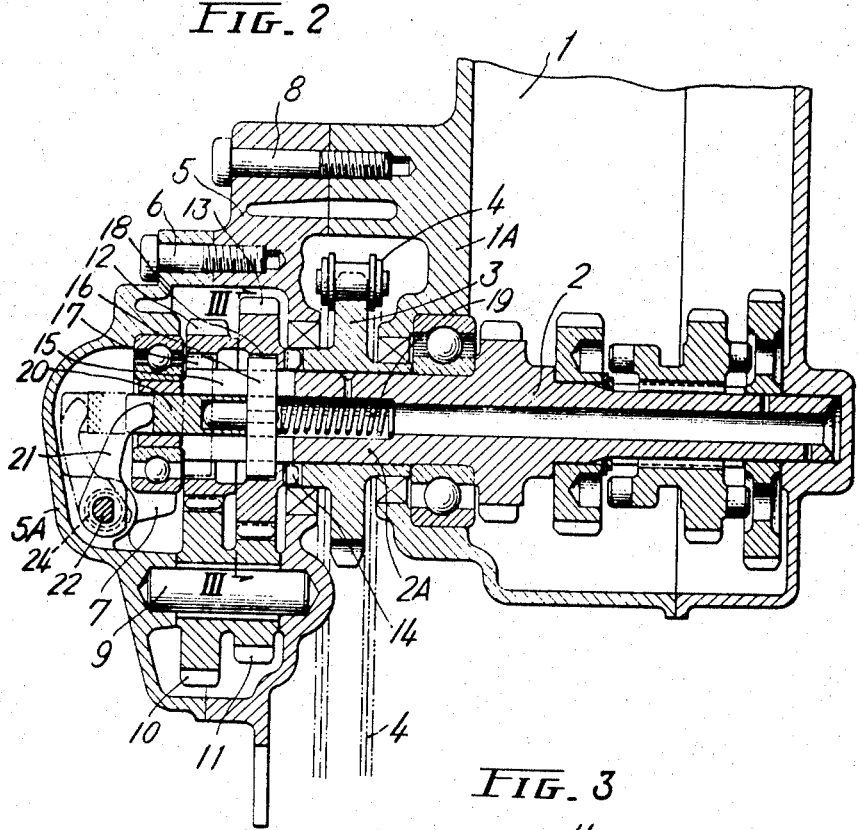
FIGURE 2 is a sectional view taken along line II—II in FIG. 1.
Figure 3:
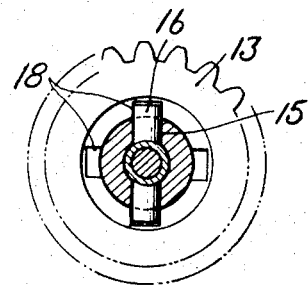
FIGURE 3 is a sectional view taken along line III—III in FIG. 2.

In the drawing, numeral 1 denotes a frame of a motorized two-wheel vehicle. A drive or output shaft 2 is rotatably supported in frame 1 and is driven in rotation by an internal combustion engine (not shown). An end portion 2A of the output shaft 2 projects from a side wall 1A of the frame 1, and a driving sprocket 3 is mounted loosely on said end portion 2A. A chain 4 is mounted on sprocket 3 and is connected with a drive wheel of the vehicle (not shown) to drive the same. Numeral 5 designates a cover for the driving sprocket 3 and the cover 5 is secured to the frame 1 by bolts 8. For the convenience of assembly, the cover 5 is so formed that an outside portion 5A thereof is a separate body from the main cover body and is secured thereto by bolts 6. A chamber 7 is formed within the cover 5 outside of the driving sprocket 3, and within this chamber 7 is a speed reducing gear assembly 10–13 constituted as follows:

Two stage gears 10 and 11 formed integral with one another are mounted loosely on a fixed shaft 9 at the lower portion of the cover 5, and speed reducing gears 12 and 13 are in mesh respectively with gears 10 and 11. The gear 13 and the driving sprocket 3 are in driving engagement via an engaging claw arrangement 14. A speed changing claw rod 16 is mounted slidably in a guide groove 15 formed longitudinally in the end portion 2A of the output shaft 2. Groove openings 17 and 18 are formed respectively in the inner surfaces of the speed changing gears 12 and 13 for selective engagement of the claw rod 16. When the rod 16 is engaged in the grooves 18 as shown in FIG. 3, the shaft 2 is coupled in driving relation with gear 13. Conversely, when the rod 16 is engaged in grooves 17, the shaft 2 is coupled in driving relation with gear 12. A spring 19 acts on the claw rod 16 to urge the rod 16 outwards towards groove 17. A push rod 20 extends outwards from the claw rod 16 into engagement with an arm 21 pivotally mounted on a shaft 22 supported by the portion 5A of the cover 5. As shown in FIGS. 1 and 4, an operation lever 23 is formed at one end of shaft 22 and a spring 24 acts on the other end of the shaft 22 to urge the same to a retracted position in portion 5A of cover 5. The operation lever 23 can be manually operated so that the lever can be selectively placed in one of two notches 25A and 25B at the edge of the portion 5A, whereby the arm 21 may be selectively retained in either of the two positions shown by full lines and chain lines in FIG. 2. It will be clear that by operation of the lever 23 to engage the lever in the notch 25A or 25B, the speed changing claw rod 16 can be selectively engaged with either of the two gears 12 and 13 so that the driving sprocket 3 is connected to the output shaft 2 directly, or through the speed reducing gear assembly in the order 12–10–11–13 for speed reduction.

The driving apparatus according to the present invention has the following advantages when related to a motorized two-wheel vehicle:

Namely, the provision of the speed reducing gear assembly 10–13 enables the speed reducing operation to be much easier than heretofore possible, and also since the speed reducing gear assembly is provided within the chamber 7 formed within the cover 5 at the outside of the driving sprocket 3, the apparatus is applicable to a conventional motorized two-wheel vehicle only by reconstructing the end portion of the output shaft and the cover in said conventional vehicle. Furthermore, the construction may be simplified because the end portion 2A of the output shaft 2 is utilized as one side shaft for the speed reducing gear assembly.

What is claimed is:

1. A speed change device for a two-wheel vehicle, having a drive shaft with a sprocket loosely mounted thereon connected in driving relation via a chain with a drive wheel of the vehicle, said drive shaft being supported in a frame and including a portion extending from the frame, said device comprising a gear assembly mounted on said drive shaft in driving relation with the sprocket, a hollow cover on said frame covering said sprocket and enclosing said portion of the drive shaft and said gear assembly, a second shaft in said cover extending parallel to said drive shaft, a claw rod within said cover and slidably mounted with respect to said drive shaft for engaging the gear assembly in several displaced locations to drive the sprocket from the drive shaft via the gear assembly at different speeds, and means acting on said claw rod and having a number of settable positions in which the claw rod is moved to said respective locations, said gear assembly including gears mounted on said drive shaft and said second shaft and being in mesh to constitute a speed reducing unit, said gear assembly being engageably by said claw rod to connect the drive shaft and the sprocket in direct relation or to connect the drive shaft and the sprocket through the gear assembly such that the sprocket is driven at reduced speed, said means including an operating lever projecting from the cover for displacing the claw rod, the latter being selectively engageable in driving relation with the gears of the gear assembly for the driving of the sprocket.

2. A device as claimed in claim 1, wherein said gears of the gear assembly comprise first and second gears of different size loosely mounted on the drive shaft, the first gear being drivingly connected with the sprocket, and third and fourth gears in mesh with the first and second gears respectively, said third and fourth gears being rotatable together and loosely mounted on said second shaft, said claw rod being selectively engageable in driving relation with the first and second gears to drive the sprocket either directly from said first gear or from the second gear to the first gear via the third and fourth gears.

3. A device as claimed in claim 2, wherein said first and second gears are provided with grooves, said claw rod being slidable on said drive shaft for being engaged in the grooves of said first and second gears to selectively drive the same.

4. A device as claimed in claim 3, wherein said first and second gears have notches for respectively receiving said claw rod, said shaft having a guide groove in which said rod is displaceably guided for movement between said settable positions in which the notches in the first and second gears are respectively engaged.

5. A device as claimed in claim 3, wherein said lever is displaceable between first and second positions and means coupled to said lever and acting on said claw rod to displace the same for engagement with the first and second gears.

6. A device as claimed in claim 5, wherein said cover has two notches in which the lever is selectively engageable to displace the rod between the locations in which it is in engagement with the first and second gears.

7. A device as claimed in claim 6, wherein said means includes a rotatable shaft in the cover extending transversely of the other said shafts, said lever being mounted on said rotatable shaft to angularly displace the same as the lever is moved between said notches, an arm secured on said rotatable shaft for rotation therewith, the claw rod including a push rod extending therefrom into engagement with said arm, such that as the arm is rotated with said rotatable shaft the claw rod is displaced on said drive shaft.

References Cited

UNITED STATES PATENTS

| 2,592,982 | 4/1952 | Violet | 74—372 |
| 2,811,049 | 10/1957 | Dennis | 74—370 |
| 3,318,408 | 5/1967 | Hopkins | 74—217 |

FOREIGN PATENTS

| 69,356 | 6/1941 | Czechoslovakia. |

LEONARD H. GERIN, *Primary Examiner.*

U.S. Cl. X.R.

74—745